(12) United States Patent
Matsuo (10) Patent No.: US 9,393,670 B2
(45) Date of Patent: Jul. 19, 2016

(54) MEASURING METHOD OF SURFACE ROUGHNESS OF POLISHING PAD

(71) Applicant: EBARA CORPORATION, Tokyo (JP)

(72) Inventor: Hisanori Matsuo, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 31 days.

(21) Appl. No.: 14/463,214

(22) Filed: Aug. 19, 2014

(65) Prior Publication Data

US 2015/0056891 A1    Feb. 26, 2015

(30) Foreign Application Priority Data

Aug. 22, 2013   (JP) .................................. 2013-172218

(51) Int. Cl.
| | |
|---|---|
| *B24B 37/24* | (2012.01) |
| *B24D 11/00* | (2006.01) |
| *B24B 37/10* | (2012.01) |
| *B24B 49/12* | (2006.01) |
| *B24B 37/005* | (2012.01) |
| *B24B 53/017* | (2012.01) |
| *G01B 11/30* | (2006.01) |

(52) U.S. Cl.
CPC ............. *B24B 49/12* (2013.01); *B24B 37/005* (2013.01); *B24B 53/017* (2013.01); *G01B 11/303* (2013.01)

(58) Field of Classification Search
CPC .... B24B 49/12; B24B 37/005; B24B 53/017; G01B 11/303
See application file for complete search history.

(56) References Cited

U.S. PATENT DOCUMENTS

| | | | | |
|---|---|---|---|---|
| 5,708,506 A | * | 1/1998 | Birang | B24B 49/12 356/600 |
| 6,040,244 A | * | 3/2000 | Arai | B24B 37/005 438/691 |
| 6,336,842 B1 | * | 1/2002 | Ootsuki | B24B 53/017 451/177 |
| 7,018,269 B2 | | 3/2006 | Anderson | |
| 7,201,632 B2 | * | 4/2007 | Elledge | B24B 37/005 451/10 |
| 7,258,596 B2 | * | 8/2007 | Elledge | B24B 1/04 451/56 |
| 9,138,860 B2 | * | 9/2015 | Dhandapani | B24B 37/042 |
| 2005/0090185 A1 | * | 4/2005 | Fujishima | B24B 53/017 451/5 |
| 2005/0239380 A1 | | 10/2005 | Hosaka et al. | |
| 2007/0049168 A1 | * | 3/2007 | Fujita | B24B 53/017 451/6 |

FOREIGN PATENT DOCUMENTS

| | | |
|---|---|---|
| JP | 2005-260185 A | 9/2005 |
| JP | 2005-333121 A | 12/2005 |

* cited by examiner

*Primary Examiner* — Dung Van Nguyen
(74) *Attorney, Agent, or Firm* — Pearne & Gordon LLP (57) ABSTRACT

There is disclosed a measuring method of a surface roughness of a polishing pad which can measure a surface roughness index of the polishing pad showing a strong relationship with polishing performance. A method for measuring a surface roughness of a polishing pad includes acquiring an image of a surface of a polishing pad by using a laser microscope, selecting only a region which has a height larger than an average height from the acquired image, and calculating a surface roughness from only the selected region.

20 Claims, 5 Drawing Sheets

| | | | | | |
|---|---|---|---|---|---|
| | RR [nm/min] | 0.815927025 | 0.982491262 | 1.101786146 | 1.099795567 |
| Ra [μm] normalized | WHOLE REGION | 0.961770942 | 0.873798828 | 1.097236497 | 1.067193733 |
| | SELECTED REGION | 0.714357322 | 0.984174723 | 1.103329753 | 1.198138203 |
| Ra [μm] | WHOLE REGION | 111.5133333 | 101.3133333 | 127.22 | 123.7366667 |
| | SELECTED REGION | 8.313333333 | 11.45333333 | 12.84 | 13.94333333 |

FIG. 4

| Area | R2 |
|---:|---:|
| 2500 | 0.4245214 |
| 900 | 0.77620299 |
| 400 | 0.773413904 |
| 225 | 0.908625462 |
| 100 | 0.865980158 |
| 25 | 0.937497763 |
| 100 | 0.96245968 |

FIG. 5

| MAGNIFICATION | Area | R2 |
|---|---|---|
| X20 | 372253 | 0.056283478 |
| X50 | 59474 | 0.409050561 |
| X100 | 15195 | 0.746304651 |

MEASURING METHOD OF SURFACE ROUGHNESS OF POLISHING PAD

CROSS REFERENCE TO RELATED APPLICATION

This document claims priority to Japanese Patent Application Number 2013-172218 filed Aug. 22, 2013, the entire contents of which are hereby incorporated by reference.

BACKGROUND

In recent years, high integration and high density in semiconductor device demands smaller and smaller wiring patterns or interconnections and also more and more interconnection layers. Multilayer interconnections in smaller circuits result in greater steps which reflect surface irregularities on lower interconnection layers. An increase in the number of interconnection layers makes film coating performance (step coverage) poor over stepped configurations of thin films. Therefore, better multilayer interconnections need to have the improved step coverage and proper surface planarization. Further, since the depth of focus of a photolithographic optical system is smaller with miniaturization of a photolithographic process, a surface of the semiconductor device needs to be planarized such that irregular steps on the surface of the semiconductor device will fall within the depth of focus.

Thus, in a manufacturing process of a semiconductor device, it increasingly becomes important to planarize a surface of the semiconductor device. One of the most important planarizing technologies is chemical mechanical polishing (CMP). Thus, there has been employed a chemical mechanical polishing apparatus for planarizing a surface of a semiconductor wafer. In the chemical mechanical polishing apparatus, while a polishing liquid containing abrasive particles such as silica ($SiO_2$) or ceria ($CeO_2$) therein is supplied onto a polishing pad, a substrate such as a semiconductor wafer is brought into sliding contact with the polishing pad, so that the substrate is polished.

The above CMP process is performed by using a polishing apparatus comprised of a polishing table having a polishing pad, and a substrate holding device, which is referred to as a carrier or a top ring, for holding a semiconductor wafer (substrate) such that the substrate is held and pressed against the polishing pad under a predetermined pressure by the substrate holding device to polish an insulating film or a metal film on the substrate.

After one or more substrates have been polished, abrasive particles and polishing debris are attached to a surface of the polishing pad, and the surface configuration and the condition of the polishing pad are changed, and thus the polishing performance is deteriorated. Therefore, as the substrates are repeatedly polished, a polishing rate is lowered and non-uniform polishing is caused. Thus, dressing (conditioning) of the polishing pad is performed by using a dresser to regenerate the surface configuration and the condition of the polishing pad which has deteriorated.

As described above, although the dressing (conditioning) of the polishing pad is performed during the process of CMP, the dressing conditions of the polishing pad are determined mainly based on empirical rules. There has not been employed a dressing method which evaluates the surface of the polishing pad quantitatively and then determines the optimum dressing conditions.

Further, in a measuring method of a surface roughness of the polishing pad, the surface roughness indexes, represented by the arithmetical mean deviation of the roughness profile (Ra) or the root mean square deviation of the roughness profile (Rq), are determined by using a laser microscope, but the determined surface roughness indexes show a poor relationship with the CMP polishing performance.

For example, in Japanese Laid-Open Patent Publication Nos. 2005-260185, 2005-333121, and U.S. Patent Application Publication No. 2005/0239380, surface roughnesses of a portion of a polishing pad are specified, but a measuring method of the surface roughness is not clearly described. The present inventors have found from verification that the surface roughness indexes which show a strong relationship with the polishing performance cannot be obtained unless the measuring method is devised.

SUMMARY OF THE INVENTION

According to an embodiment, there is provided a measuring method of a surface roughness of a polishing pad which can measure a surface roughness index of the polishing pad showing a strong relationship with polishing performance.

Further, according to another embodiment, there is provided a CMP method which can perform CMP process based on a surface roughness index determined by a measuring method of a surface roughness of a polishing pad.

Embodiments, which will be described below, relate to a measuring method of a surface roughness of a polishing pad which measures a surface roughness of a polishing pad used for polishing a substrate such as a semiconductor wafer.

In an embodiment, there is provided a method for measuring a surface roughness of a polishing pad, comprising: acquiring an image of a surface of a polishing pad by using a laser microscope; selecting only a region which has a height larger than an average height from the acquired image; and calculating a surface roughness from only the selected region.

According to the embodiment, the selection of the region for calculating the surface roughness of the polishing pad is to select the region which has a large height from the image plane acquired by the laser microscope. One of the criteria for the selection is that the average height is determined automatically by numerical calculations from the cross-sectional shape of the polishing pad surface, and the region which has a height larger than the determined average height is selected as a calculation region. Since the surface roughness of the very top surface of the polishing pad surface is thought to determine the polishing performance, only the more limited region can be selected as the region to be calculated. When the surface roughness calculation region is selected, the surface roughness is determined from only the calculation region.

In an embodiment, in the selecting the region, the region having an area of 500 $\mu m^2$ or less is selected.

Figure 4:
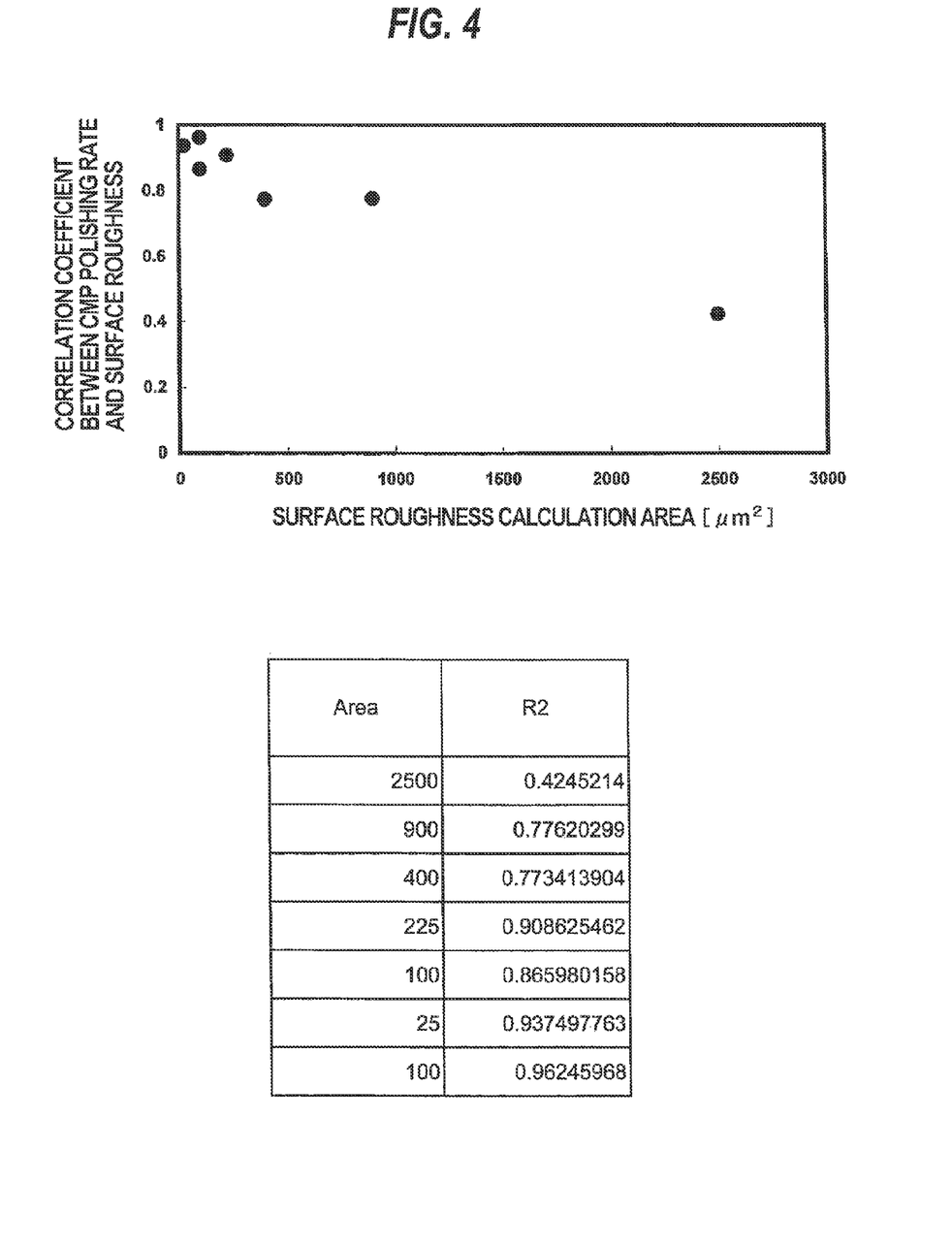
FIG. 4 is a table and a graph which show the relationship between the correlation coefficient between the surface roughness and the polishing rate, and the area of the region selected to calculate the surface roughness.

It has been found from experiments by the present inventors that as the area of the selected region is smaller, there is a stronger correlation between the surface roughness and the polishing performance (see FIG. 4). Therefore, in an embodiment, the correlation coefficient is not less than approximately 0.8 (the correlation coefficient≥approximately 0.8) as a rough indication, and thus the selected area is determined to be 500 $\mu m^2$ or less.

In an embodiment, in the acquiring the image, an area of the acquired image is 100000 $\mu m^2$ or less.

Figure 5:
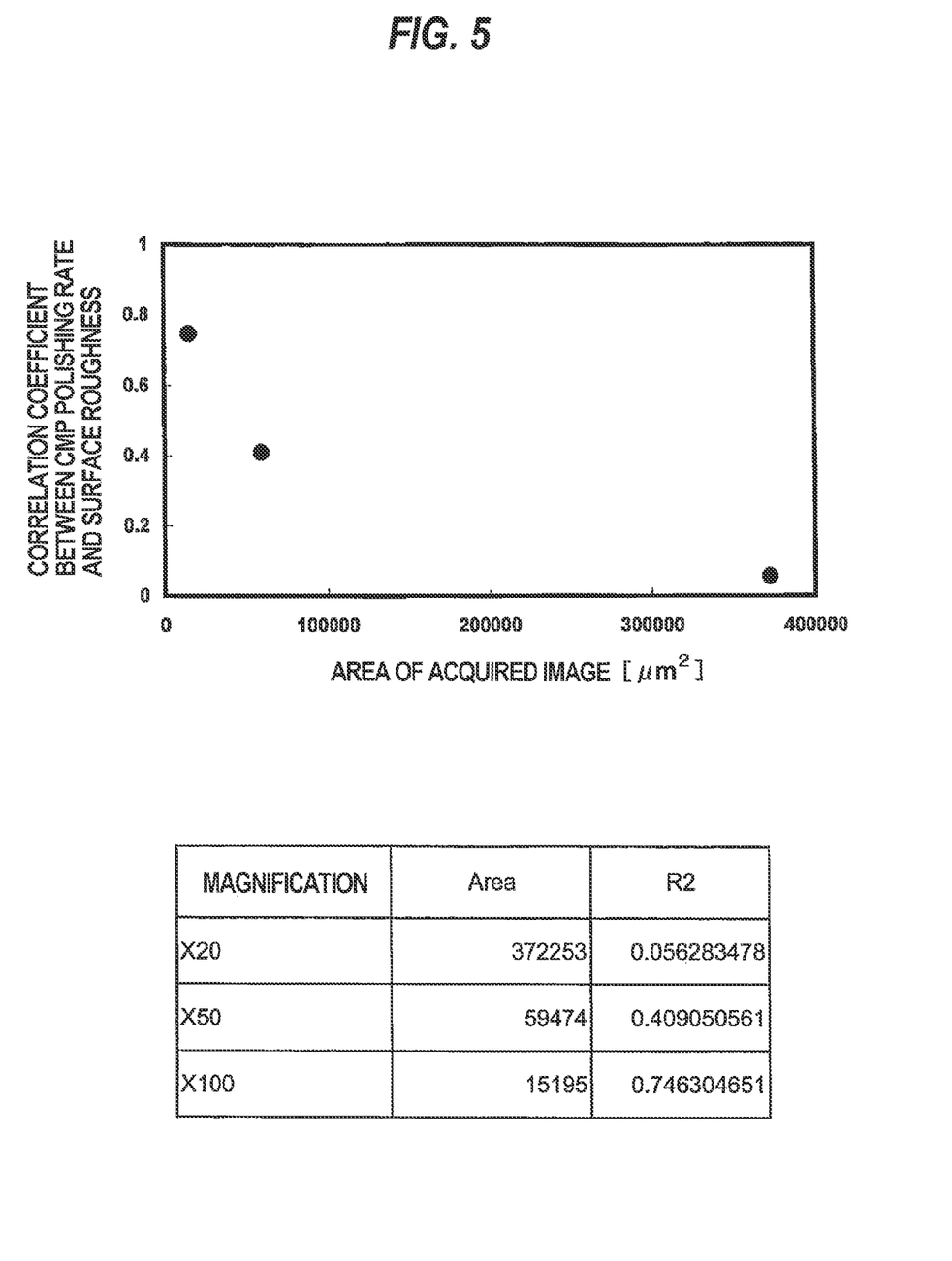
FIG. 5 is a table and a graph which show the relationship between the correlation coefficient between the surface roughness and the polishing rate, and the area of the image acquired by the laser microscope.

It has been found from experiments by the present inventors that as the area of the acquired image is smaller, there is a stronger correlation between the surface roughness and the polishing performance (see FIG. 5). Therefore, in an embodiment, the area of the acquired image is determined to be 100000 $\mu m^2$ or less.

In an embodiment, in the selecting the region, only the plural regions which have a height larger than the average height are selected from the acquired image.

In an embodiment, in the determining the surface roughness, surface roughnesses respectively determined from calculation regions at a plurality of locations are averaged to thereby determine the surface roughness.

In an embodiment, the calculated surface roughness is at least one of arithmetical mean deviation of the roughness profile (Ra), root mean square deviation of the roughness profile (Rq), maximum profile valley depth of the roughness profile (Ry), maximum profile peak height of the roughness profile (Rp), and maximum height of the roughness profile (Rz).

In an embodiment, the calculated surface roughness is at least one of arithmetical mean deviation of the roughness profile (Ra) and root mean square deviation of the roughness profile (Rq).

In an embodiment, in the selecting the region, the region is selected from a region which falls within top 30% of all the heights.

In an embodiment, there is provided a CMP method comprising: predicting polishing performance of CMP based on a surface roughness of a polishing pad which is measured by a method for measuring a surface roughness of a polishing pad; the method for measuring a surface roughness of a polishing pad, comprising: acquiring an image of a surface of the polishing pad by using a laser microscope; selecting only a region which has a height larger than an average height from the acquired image; and calculating the surface roughness from only the selected region.

Since it has been confirmed that the surface roughness of the polishing pad determined by the method according to an embodiment has a correlation with the polishing rate, the polishing performance can be estimated from the surface roughness of the polishing pad. Specifically, the surface roughness of the polishing pad is calculated, and thus the polishing rate can be predicted.

In an embodiment, at least one of polishing conditions and dressing conditions is adjusted based on the predicted polishing performance.

In an embodiment, at least one of a lifetime of the polishing pad and a lifetime of a dresser is predicted based on the predicted polishing performance.

In an embodiment, polishing conditions are adjusted based on the predicted polishing performance, and a substrate is polished under the adjusted polishing conditions.

In an embodiment, there is provided a CMP method comprising: selecting dressing conditions for a surface of a polishing pad so that a surface roughness of the polishing pad which is measured by a method for measuring a surface roughness of a polishing pad becomes equal to a preset surface roughness; the method for measuring a surface roughness of a polishing pad, comprising: acquiring an image of a surface of the polishing pad by using a laser microscope; selecting only a region which has a height larger than an average height from the acquired image; and calculating the surface roughness from only the selected region.

In an embodiment, at least one of a type of a dresser, a load during dressing, and the number of revolutions during the dressing is selected as the dressing conditions.

In an embodiment, there is provided an apparatus for measuring a surface roughness of a polishing pad, comprising: acquiring an image of a surface of a polishing pad; selecting only a region which has a height larger than an average height from the acquired image; and calculating a surface roughness from only the selected region.

According to the above-described embodiments, a surface roughness of a polishing pad showing a strong relationship with polishing performance can be measured. Further, polishing performance such as a polishing rate can be estimated from the measured surface roughness.

Furthermore, according to the above-described embodiments, on the basis of the estimated polishing performance, the polishing conditions such as a polishing time or the dressing conditions of the polishing pad are adjusted, and thus the CMP method which achieves the desirable polishing performance can be provided.

DESCRIPTION OF EMBODIMENTS

A measuring method of a surface roughness of a polishing pad according to an embodiment will be described below with reference to FIGS. 1 through 5. Like or corresponding parts are denoted by corresponding reference numerals in FIGS. 1 through 5 and will not be described below repetitively.

Figure 1:
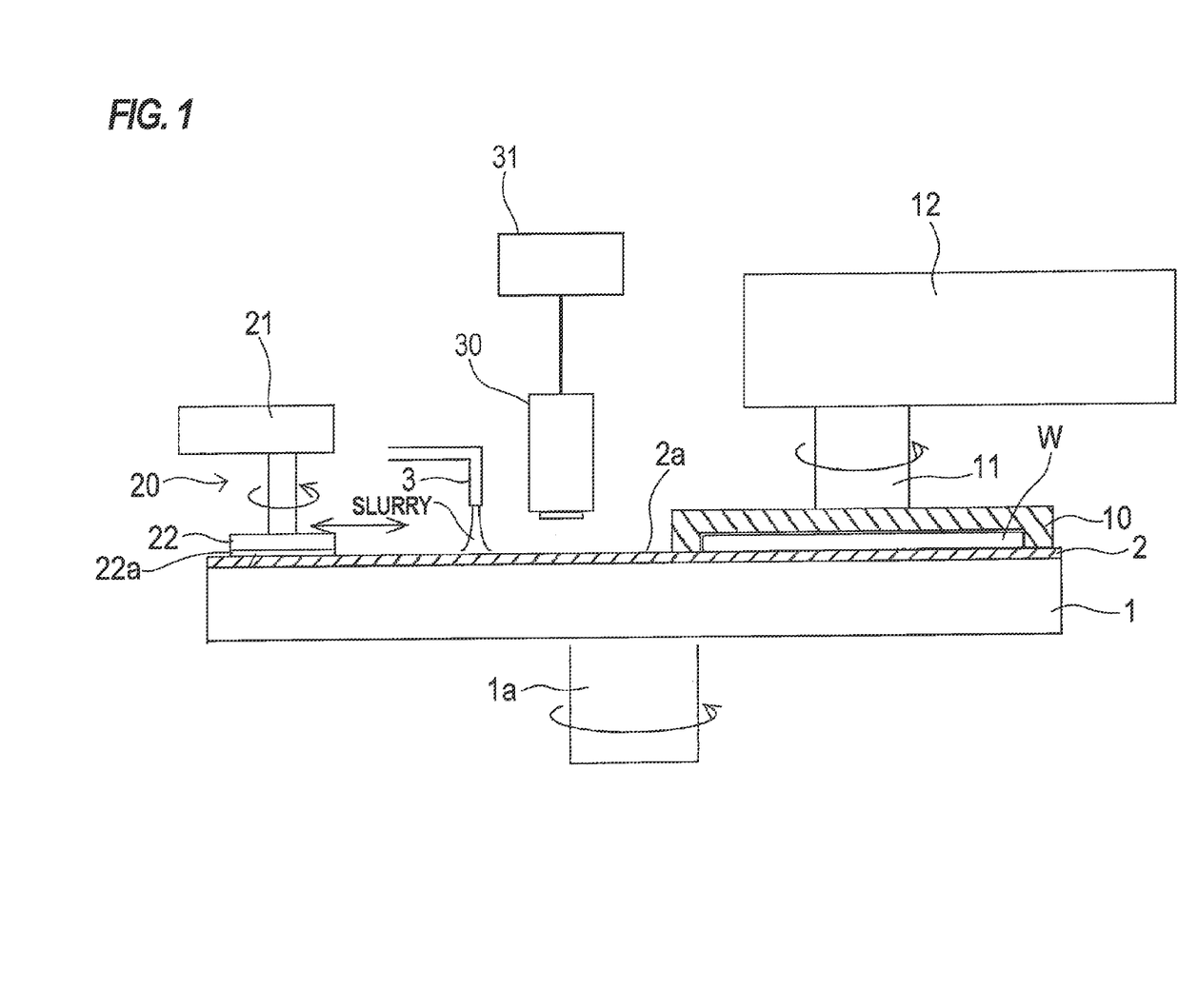
FIG. 1 is a schematic view showing an entire structure of a polishing apparatus which performs a method for measuring a surface roughness of a polishing pad according to an embodiment.

FIG. 1 is a schematic view showing an entire structure of a polishing apparatus which performs a measuring method of a surface roughness of a polishing pad according to an embodiment. As shown in FIG. 1, the polishing apparatus includes a polishing table 1, and a top ring 10 for holding a substrate W such as a semiconductor wafer as an object to be polished and pressing the substrate W against a polishing pad 2 on the polishing table 1. The polishing table 1 is coupled via a table shaft 1a to a polishing table rotating motor (not shown) disposed below the polishing table 1. Thus, the polishing table 1 is rotatable about the table shaft 1a. The polishing pad 2 is attached to an upper surface of the polishing table 1. A surface of the polishing pad 2 constitutes a polishing surface 2a for polishing the substrate W. The polishing pad 2 comprising SUBA800, IC1000, IC1000/SUBA400 (two-layered cloth) manufactured by the Dow Chemical Company, or the like is used. SUBA800 is a non-woven fabric made of fibers fixed with urethane resin. IC1000 is a pad made of hard perforated polyurethane and having a large number of fine holes (pores) formed in its surface, and is also called a perforated pad. A polishing liquid supply nozzle 3 is provided above the polishing table 1 to supply a polishing liquid (slurry) onto the polishing pad 2 on the polishing table 1.

The top ring 10 is connected to a top ring shaft 11, and the top ring shaft 11 is vertically movable with respect to a top ring head 12. When the top ring shaft 11 moves vertically, the top ring 1 is lifted and lowered as a whole to be positioned with respect to the top ring head 12. The top ring shaft 11 is configured to be rotated by driving a top ring rotating motor (not shown). The top ring 1 is rotated about the top ring shaft 11 by the rotation of the top ring shaft 11.

As shown in FIG. 1, the top ring 10 is configured to hold the substrate W such as a semiconductor wafer on its lower surface. The top ring head 12 is configured to be pivotable about a top ring head shaft (not shown). Thus, the top ring 10, which holds the substrate W on its lower surface, is movable between a substrate transferring position and a position above the polishing table 1 by the pivotable movement of the top ring head 12. The top ring 10 holds the substrate W on its lower surface and presses the substrate W against the surface (polishing surface) of the polishing pad 2. At this time, while the polishing table 1 and the top ring 10 are respectively rotated, a polishing liquid (slurry) is supplied onto the polishing pad 2 from the polishing liquid supply nozzle 3 provided above the polishing table 1. The polishing liquid containing silica ($SiO_2$) or ceria ($CeO_2$) as abrasive particles is used. In this manner, while the polishing liquid is supplied onto the polishing pad 2, the substrate W is pressed against the polishing pad 2 and the substrate W and the polishing pad 2 are moved relative to each other to polish an insulating film, a metal film or the like on the substrate. Examples of the insulating film include $SiO_2$, and examples of the metal film include a Cu film, a W film, a Ta film and a Ti film.

As shown in FIG. 1, the polishing apparatus has a dressing apparatus 20 for dressing the polishing pad 2. The dressing apparatus 20 includes a dresser arm 21, and a dresser 22 which is rotatably attached to the dresser arm 21. The lower part of the dresser 22 comprises a dressing member 22a, which has a circular dressing surface. Hard particles are fixed to the dressing surface by electrodeposition or the like. Examples of the hard particles include diamond particles, ceramic particles and the like. A motor (not shown) is provided in the dresser arm 21, and the dresser 22 is rotated by the motor. The dresser arm 21 is coupled to a lifting and lowering mechanism (not shown), and the dresser arm 21 is lowered by the lifting and lowering mechanism to allow the dressing member 22a to be pressed against the polishing surface 2a of the polishing pad 2. Equipments including the polishing table 1, the top ring 10, the dressing apparatus 20 and the like are connected to a controller (not shown), and the rotational speed of the polishing table 1, the rotational speed and the polishing pressure of the top ring 10, the load and the oscillating speed of the dresser 22 of the dressing apparatus 20, and the like are controlled by the controller. Further, the controller has a control unit capable of adjusting polishing conditions and dressing conditions according to predicted polishing performance based on the surface roughness of the polishing pad.

As shown in FIG. 1, an optical system unit 30 for irradiating the surface of the polishing pad 2 with a laser light and receiving a reflected light that is reflected and scattered by the surface of the polishing pad 2 is provided above the polishing pad 2 on the polishing table 1. The optical system unit 30 is connected to an image processing unit 31, provided outside the polishing table 1, which images the reflected light received by the optical system unit 30 and measures a surface roughness of the polishing pad 2. The optical system unit 30 and the image processing unit 31 constitute a laser microscope.

In the polishing apparatus configured as shown in FIG. 1, when the surface roughness of the polishing pad 2 is measured, an image of the surface of the polishing pad 2 is acquired by using the laser microscope comprising the optical system unit 30 and the image processing unit 31, and in the acquired image, large height portions of the polishing pad are selected, and then the surface roughness is determined from only the region having a predetermined area among the selected portions. Here, when a plane which is formed on reference points set by the laser microscope is assumed to be a reference plane (zero plane), the height of the polishing pad is defined as a relative height from the reference plane to the surface of the polishing pad. The surface roughness is geometric quantity representing minute irregularities on the surface of a physical object. The region where the laser microscope acquires an image is a region larger than the hole of the polishing pad, and has an enough size to select the large height portion. Specifically, the area of the region of the polishing pad which is selected to determine the surface roughness is in the range of 25 to 1000 $\mu m^2$, more preferably 50 to 500 $\mu m^2$. In order to enable to select the region having such an area sufficiently, the region area of the polishing pad in the whole image acquired by the laser microscope is in the range of 5000 to 500000 $\mu m^2$, more preferably 10000 to 100000 $\mu m^2$. Naturally, the optimum region to be selected and the optimum area of the whole image vary depending on the size of the hole of the polishing pad, and thus can be changed appropriately according to the kind of the polishing pad. As an example of the size of the hole in the polishing pad, in the IC1000 pad manufactured by the Dow Chemical Company, the hole has an area of approximately 4000 to 3000 $\mu m^2$.

Generally, since the surface roughness of the polishing pad shows large variations depending on a measuring location, large height regions of the polishing pad at the plural locations are selected from the acquired image plane, and among the selected plural locations, regions which have an area larger than a predetermined area are specified. For example, the regions, at ten locations, which have a large height of the polishing pad are selected. It is preferable that surface roughnesses determined in the respective selected regions are averaged, and the averaged surface roughness is represented as a surface roughness of the whole acquired image.

The determined surface roughness includes the arithmetical mean deviation of the roughness profile (Ra), the root mean square deviation of the roughness profile (Rq), the maximum profile valley depth of the roughness profile (Rv), the maximum profile peak height of the roughness profile (Rp), and the maximum height of the roughness profile (Rz). The present inventors have clarified that among the above indexes, the arithmetical mean deviation of the roughness profile (Ra) and the root mean square deviation of the roughness profile (Rq) particularly show a strong relationship with the polishing performance.

Figure 2A:
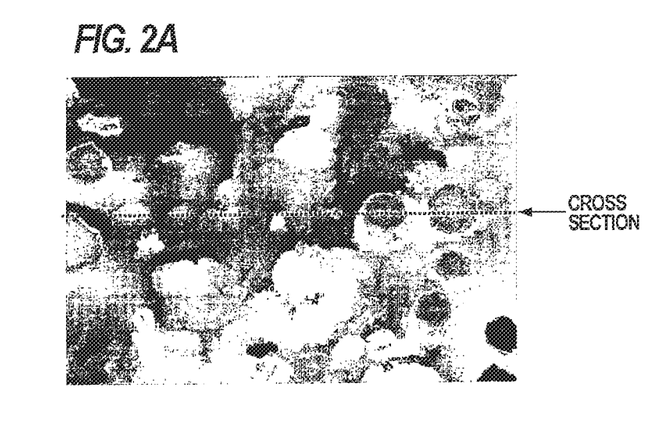
FIG. 2A is an image acquired by a laser microscope.
Figure 2B:
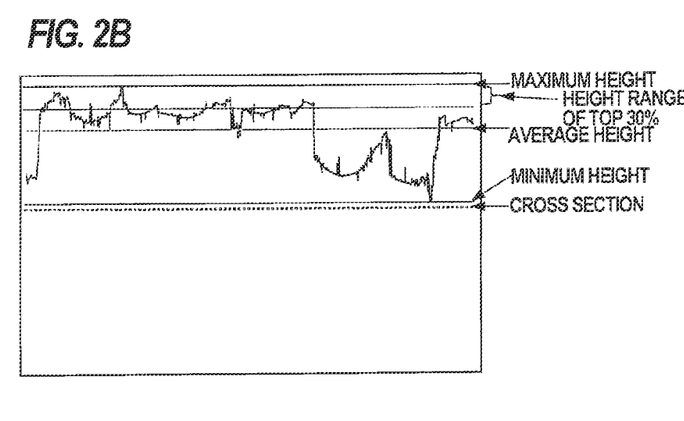
FIG. 2B is a view showing a cross-sectional shape of a polishing pad surface at the location shown by a dashed line in FIG. 2A.

FIGS. 2A and 2B show an image by the laser microscope, and a cross-sectional shape at the portion shown by a dashed line, respectively. FIG. 2A is an image acquired by the laser microscope, and FIG. 2B shows a cross-sectional shape showing irregularities of the polishing pad surface at the location shown by a dashed line in FIG. 2A.

The selection of the region for calculating the surface roughness of the polishing pad is to select the region which has a large height from the image plane acquired by the laser microscope. One of the criteria for the selection is that the average height is determined automatically by numerical calculations from the cross-sectional shape of the polishing pad surface, and the region which has a height larger than the determined average height is selected as a calculation region. A portion or portions above a line of the average height shown in FIG. 2B are selected. Since the surface roughness of the very top surface of the polishing pad surface is thought to determine the polishing performance, only the more limited region can be selected as the region to be calculated. For example, the region which falls within the top 30% of all the heights appearing in the image, or further, the region which falls within the top 10% thereof, can be selected as the calculation region. The location where the cross section is taken in FIG. 2A can be moved in a vertical direction at an arbitrary interval. Further, in the process of selecting the region to be calculated, a plurality of regions which have a height larger than the average height in the acquired image may be selected, and thus a plurality of surface roughness calculation regions may be set.

When the surface roughness calculation regions are selected or set in the above described manner, surface roughnesses are determined from only these calculation regions. Further, the surface roughnesses respectively determined from the plural calculation regions are averaged to thereby determine a surface roughness.

The surface roughness can be represented by the arithmetical mean deviation of the roughness profile (Ra), the root mean square deviation of the roughness profile (Rq), the maximum profile valley depth of the roughness profile (Rv), the maximum profile peak height of the roughness profile (Rp), and the maximum height of the roughness profile (Rz), and the like. When placing emphasis on the relationship with the polishing performance of the polishing pad, the surface roughness is preferably represented by the arithmetical mean deviation of the roughness profile (Ra) or the root mean square deviation of the roughness profile (Rq).

Figure 3:
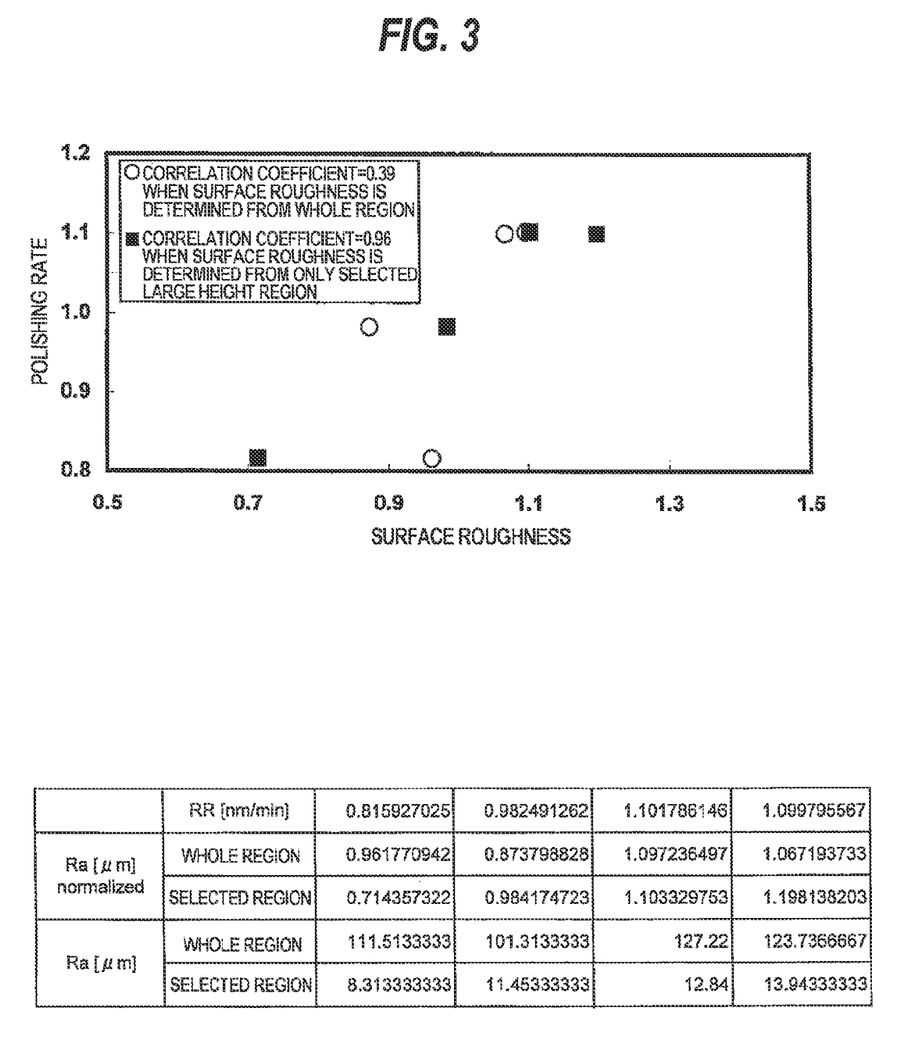
FIG. 3 is a table and a graph of measured data showing the relationship between a surface roughness (Ra) and a polishing rate (RR)

The present inventors have found that the surface roughness determined in this manner shows a strong relationship with the polishing performance. FIG. 3 is a table and a graph of measured data showing the relationship between the surface roughness (Ra) and a polishing rate (RR). The unit of the polishing rate is nm/min. The data shown in the table of FIG. 3 represent the surface roughnesses of the polishing pad surface and the normalized surface roughnesses of the polishing pad surface when the polishing is performed at four kinds of polishing rates, and represent the values calculated from the whole regions of the images acquired by the laser microscope and the values calculated from only the selected large height parts. Here, as the large height parts, only the parts which have a height larger than the average height are selected. Of all the data shown in the table, only the normalized surface roughnesses are shown in the graph. In the graph, the points shown by circles correspond to the data in the case where the surface roughnesses are determined from the whole regions of the images, and the points shown by squares correspond to the data in the case where the surface roughnesses are determined from only the selected large height regions.

It can be seen from the graph of FIG. 3 that when only the large height region is selected to determine the surface roughness, there is a certain relationship, between the surface roughness and the polishing rate, that the polishing rate increases as the surface roughness increases. The correlation coefficient between the surface roughness and the polishing rate in the case where the surface roughness is determined from the whole region of the image was 0.39, whereas the correlation coefficient in the case where the surface roughness is determined from only the selected large height region was 0.96. Thus, it can be said that there is an extremely strong relationship also from the value of 0.96 close to 1.

FIG. 4 is a table and a graph which show the relationship between the correlation coefficient between the surface roughness and the polishing rate, and the area of the region selected to calculate the surface roughness. Here, as the large height parts, only the parts which fall within the top 30% of all the heights are selected. The area (Area) of the region selected to calculate the surface roughness and the correlation coefficient (R2) between the surface roughness and the polishing rate, which are shown in the table, are shown in the graph. As is clear from FIG. 4, as the area of the region selected to calculate the surface roughness is smaller, the correlation coefficient approaches 1. It is thought that there is a correlation when the area of the selected region is 1000 $\mu m^2$ or less. However, since the smaller area shows the more correlation, the area of the selected region is preferably 500 $\mu m^2$ or less.

FIG. 4 shows that the correlation coefficient in the case where the area of the selected region is 25 $\mu m^2$ is approximately 0.937. However, the lower limit of the area of the selected region is thought to be a few $\mu m^2$ to 10 $\mu m^2$.

FIG. 5 is a table and a graph which show the relationship between the correlation coefficient between the surface roughness and the polishing rate, and the polishing pad area of the image acquired by the laser microscope. Here, the correlation coefficient is determined from the acquired whole image. The table shows the magnification of the laser microscope, the area (Area) of the acquired image, and the correlation coefficient (R2) between the surface roughness and the polishing rate. The area (Area) of the acquired image and the correlation coefficient (R2) in the table are shown in the graph. As is clear from FIG. 5, as the area of the image acquired by the laser microscope is smaller, the correlation coefficient approaches 1. Therefore, the area of the region of the polishing pad where the image is acquired is preferably 100000 $\mu m^2$ or less.

As described above, since it has been confirmed that the surface roughness of the polishing pad determined by the method according to one embodiment has a correlation with the polishing rate, the polishing performance can be estimated from the surface roughness of the polishing pad. Specifically, the surface roughness of the polishing pad is calculated, and then the polishing rate can be predicted.

Further, on the basis of the estimated polishing performance, the polishing conditions such as a polishing time or the dressing conditions of the polishing pad are adjusted, and thus the CMP method which achieves the desirable polishing performance can be provided.

There is a strong correlation between the surface roughness of the polishing pad and the polishing rate such that the polishing rate increases when the surface roughness of the polishing pad increases, for example. On the other hand, there is a correlation also between the surface roughness of the polishing pad and the dressing conditions such that the surface roughness of the polishing pad increases when the dressing load is increased, for example. By utilizing the plural correlations related to the surface roughness of the polishing pad, the polishing conditions, the dressing conditions and the like are adjusted. For example, the polishing rate is predicted from the surface roughness of the polishing pad, based on the correlation between the surface roughness of the polishing pad and the polishing rate. Then, the predicted polishing rate and the desired polishing rate are compared, and if the predicted polishing rate is larger or smaller than the desired polishing rate, the dressing conditions (dressing load) is adjusted based on the correlation between the surface roughness of the polishing pad and the dressing conditions. By adjusting the dressing conditions, the excess or deficiency of the polishing rate is adjusted, so that the substrate (wafer) can be polished at the desired polishing rate.

Further, when the substrates (wafer) are polished consecutively, the surface roughness determined in the above manner is gradually changed, and eventually, the desired polishing performance cannot be achieved. Such a state means that the consumable parts for polishing reach the end of their service lives. Therefore, the surface roughness determined by the above method is also applicable to infer the lifetimes of the polishing pad and the dresser.

Furthermore, the dressing conditions of the polishing pad surface can be selected so that the surface roughness determined by the above method falls within the preset preferable range of the surface roughness. The selectable dressing conditions include the types (grit size and/or shape of abrasive particle) of the dresser, the load during dressing, the number of revolutions during dressing, and the like.

The polishing apparatus has a control unit which predicts the polishing performance of CMP based on the surface roughness of the polishing pad measured by the above method, and adjusts the polishing conditions and the dressing conditions based on the predicted polishing performance.

Although the embodiments of the present invention have been described herein, the present invention is not intended to be limited to these embodiments. Therefore, it should be noted that the present invention may be applied to other various embodiments within a scope of the technical concept of the present invention.

What is claimed is:

1. A method for measuring a surface roughness of a polishing pad, comprising:
    acquiring an image of a surface of a polishing pad by using a laser microscope;
    selecting only a region which has a height of the polishing pad larger than an average height calculated from the acquired image; and
    calculating a surface roughness from only the selected region.

2. The method for measuring a surface roughness of a polishing pad according to claim 1, wherein in the selecting the region, the region having an area of 500 $\mu m^2$ or less is selected.

3. The method for measuring a surface roughness of a polishing pad according to claim 1, wherein in the acquiring the image, an area of the acquired image is 100000 $\mu m^2$ or less.

4. The method for measuring a surface roughness of a polishing pad according to claim 1, wherein in the selecting the region, only the plural regions which have a height larger than the average height are selected from the acquired image.

5. The method for measuring a surface roughness of a polishing pad according to claim 4, wherein in the determining the surface roughness, surface roughnesses respectively determined from calculation regions at a plurality of locations are averaged to thereby determine the surface roughness.

6. The method for measuring a surface roughness of a polishing pad according to claim 1, wherein the calculated surface roughness is at least one of arithmetical mean deviation of the roughness profile (Ra), root mean square deviation of the roughness profile (Rq), maximum profile valley depth of the roughness profile (Ry), maximum profile peak height of the roughness profile (Rp), and maximum height of the roughness profile (Rz).

7. The method for measuring a surface roughness of a polishing pad according to claim 1, wherein the calculated surface roughness is at least one of arithmetical mean deviation of the roughness profile (Ra) and root mean square deviation of the roughness profile (Rq).

8. The method for measuring a surface roughness of a polishing pad according to claim 1, wherein in the selecting the region, the region is selected from a region which falls within top 30% of all the heights.

9. The method for measuring a surface roughness of a polishing pad according to claim 1, wherein when a plane which is formed on reference points set by the laser microscope is assumed to be a reference plane, the height of the polishing pad is defined as a relative height from the reference plane to the surface of the polishing pad.

10. A CMP method comprising:
    predicting polishing performance of CMP based on a surface roughness of a polishing pad which is measured by a method for measuring a surface roughness of a polishing pad;
    the method for measuring a surface roughness of a polishing pad, comprising:
        acquiring an image of a surface of the polishing pad by using a laser microscope;
        selecting only a region which has a height of the polishing pad larger than an average height calculated from the acquired image; and
        calculating the surface roughness from only the selected region.

11. The CMP method according to claim 10, wherein at least one of polishing conditions and dressing conditions is adjusted based on the predicted polishing performance.

12. The CMP method according to claim 10, wherein at least one of a lifetime of the polishing pad and a lifetime of a dresser is predicted based on the predicted polishing performance.

13. The CMP method according to claim 10, wherein polishing conditions are adjusted based on the predicted polishing performance, and a substrate is polished under the adjusted polishing conditions.

14. The CMP method according to claim 10, wherein polishing conditions are adjusted on the basis of the predicted polishing performance, and then a substrate is polished under the adjusted polishing conditions.

15. The CMP method according to claim 10, wherein when a plane which is formed on reference points set by the laser microscope is assumed to be a reference plane, the height of the polishing pad is defined as a relative height from the reference plane to the surface of the polishing pad.

16. A CMP method comprising:
    selecting dressing conditions for a surface of a polishing pad so that a surface roughness of the polishing pad which is measured by a method for measuring a surface roughness of a polishing pad becomes equal to a preset surface roughness;
    the method for measuring a surface roughness of a polishing pad, comprising:
        acquiring an image of a surface of the polishing pad by using a laser microscope;
        selecting only a region which has a height of the polishing pad larger than an average height calculated from the acquired image; and
        calculating the surface roughness from only the selected region.

17. The CMP method according to claim 16, wherein at least one of a type of a dresser, a load during dressing, and the number of revolutions during the dressing is selected as the dressing conditions.

18. The CMP method according to claim 16, wherein the surface of the polishing pad is dressed under the selected dressing conditions, and then a substrate is polished by the dressed polishing pad.

19. The CMP method according to claim 16, wherein when a plane which is formed on reference points set by the laser microscope is assumed to be a reference plane, the height of the polishing pad is defined as a relative height from the reference plane to the surface of the polishing pad.

20. An apparatus for measuring a surface roughness of a polishing pad, comprising:
- a laser microscope configured to acquire an image of a surface of a polishing pad; and
- an image processing unit configured to select only a region which has a height of the polishing pad larger than an average height calculated from the acquired image; and configured to calculate a surface roughness from only the selected region.

* * * * *